United States Patent [19]

Dolan

[11] Patent Number: 4,529,080

[45] Date of Patent: Jul. 16, 1985

[54] BI-DIRECTIONAL SPRING LOADED SHIFT FORK ASSEMBLY

[75] Inventor: Courtney F. Dolan, Syracuse, N.Y.

[73] Assignee: Chrysler Corporation, Highland Park, Mich.

[21] Appl. No.: 524,725

[22] Filed: Aug. 19, 1983

[51] Int. Cl.³ .............................................. F16D 13/60
[52] U.S. Cl. ............................... 192/109 A; 74/473 R; 192/82 R; 192/99 A
[58] Field of Search ................... 74/473 R; 192/82 R, 192/99 R, 99 A, 109 R, 109 A, 48.5

[56] References Cited

U.S. PATENT DOCUMENTS

| | | | |
|---|---|---|---|
| 1,778,220 | 10/1930 | Lange | 192/82 R |
| 2,053,580 | 9/1936 | Racklyeft | 192/82 R |
| 3,439,557 | 4/1969 | Bookout | 192/99 R |
| 3,580,372 | 5/1971 | Schiefer et al. | 192/99 A |
| 4,022,077 | 5/1977 | Brewer et al. | 192/109 A |
| 4,373,604 | 2/1983 | Lunn et al. | 192/48.5 |
| 4,449,416 | 5/1984 | Huitema | 192/109 A |

FOREIGN PATENT DOCUMENTS 2314006  10/1974  Fed. Rep. of Germany ... 192/109 A

Primary Examiner—Ronald C. Capossela
Attorney, Agent, or Firm—Edward P. Barthel

[57] ABSTRACT

A transfer case fork assembly for selectively shifting a vehicle powertrain clutch between two speed ranges. During the shifting to either speed range a momentary lock-up condition may result because of the applied torque to the transfer case output shaft. The invention uniquely arranges outer and inner nested spring biased brackets on the shift rail allowing subsequent lagging travel of the fork and clutch. The arrangement provides lost-motion travel of the manual shifting controls during the momentary clutch lock-up condition. Upon freeing of the clutch the spring biased brackets advance the fork thereby engaging the clutch in either its high or low speed range mode of operation.

4 Claims, 9 Drawing Figures

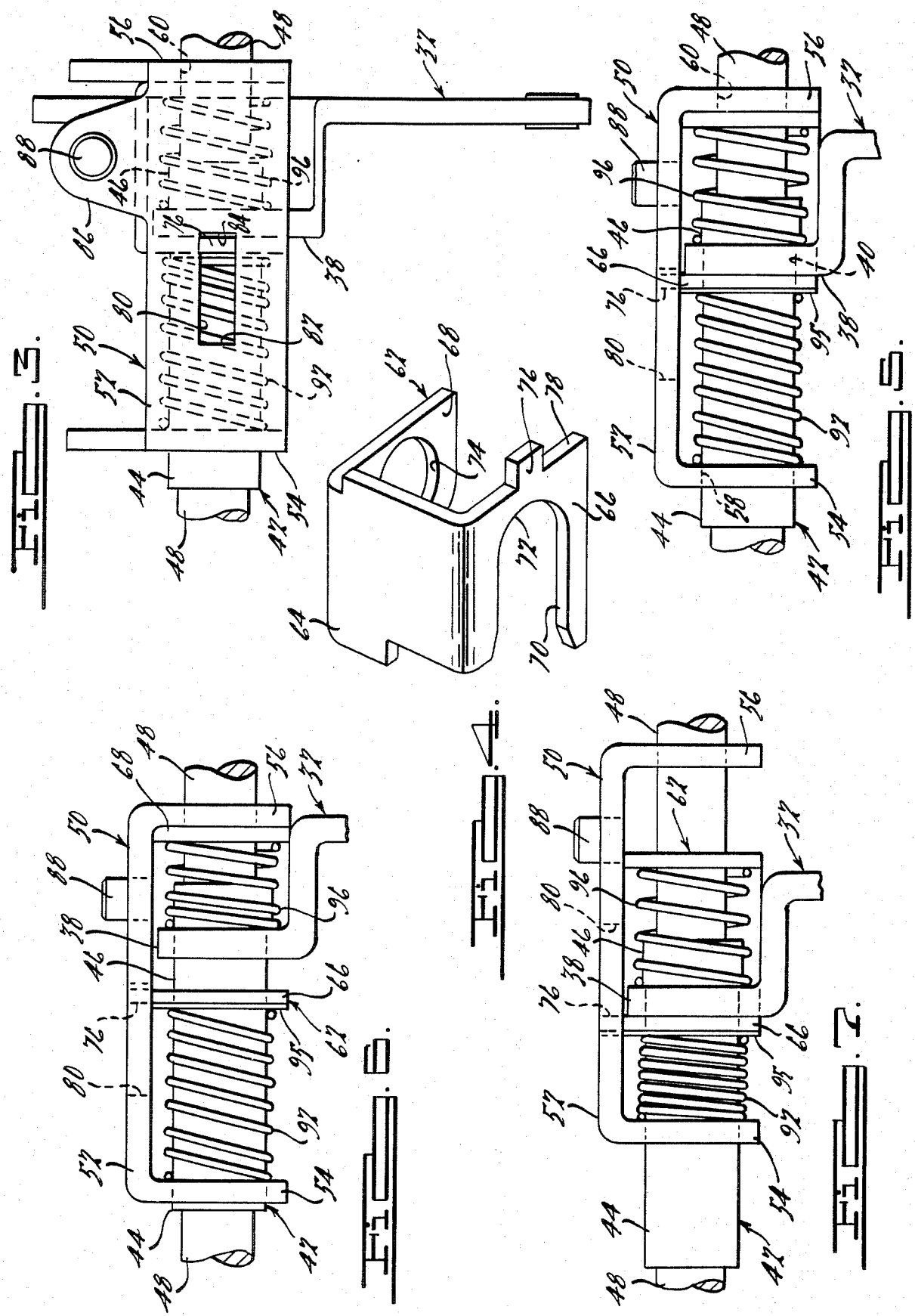

BI-DIRECTIONAL SPRING LOADED SHIFT FORK ASSEMBLY

BACKGROUND OF THE INVENTION

The present invention relates to a vehicle transfer case gear shift fork assembly.

A Society of Automotive Engineers, Inc. Technical Paper Series No. 80002 entitled, "Internal Transfer Case-Controls for Four Wheel Drive Vehicles", dated Feb. 25, 1980 by Gamble E. Huffaker discloses a mode shift arrangement for a transfer case. This transfer case is commercially available from the New Process Gear Corporation, a subsidiary of Chrysler Corporation, and carries the designation NPG Model 208.

In the Model 208 arrangement a first clutch spring encircles a shaft supporting a sliding clutch to force the clutch forward to engage clutching teeth. A second fork spring encircles the shift rail such that the shift is easily made against the spring force. When a torque reversal is obtained releasing the clutch load, the fork and mode sliding clutch are moved rearward out of engagement by their associated springs. In this arrangement the fork spring must be stronger than the clutch spring as the clutch spring is compressed in its four-wheel drive shift position. It is an object of the present invention to provide a dual fork spring arrangement wherein the relative force of each fork spring may be neglected while alternately shifting against each of their forces in opposite directions.

SUMMARY OF THE INVENTION

Motion from a shift selector is suitably transmitted from a cam plate directly to a pin on an outer bracket of a shift fork assembly slidably on a shift rail. The shift fork assembly is adapted to slide on the rail for reciprocal travel between predetermined fore and aft positions from an intermediate neutral location. The fork arm has an axially extended sleeve defining forward and aft tube portions. Outer and inner nested U-shaped brackets are slidably mounted on the shift rail assembly by means of aligned apertures in their respective side flanges. A first spring is concentrically disposed about the forward tube portion intermediate the outer bracket's one flange and the inner bracket's correponding one flange. The first spring operates to constantly bias the inner bracket other flange leg into flush contact with the corresponding flange of the outer bracket.

A second spring is concentrically disposed about the aft tube portion and the coaxial rod intermediate the fork arm and the outer bracket other flange. Guide means are provided between the brackets to limit their axial travel relative to one another. The biasing springs and nested brackets provide lost-motion movement of the fork and its clutch collar into the transfer case's selected lock and unlock modes after the shift mechanism has completed its fore or aft travel, respectively. This lost motion delay results from inherent torque resistance of the transfer case shaft preventing immediate free travel response of the clutch collar.

BRIEF DESCRIPTION OF THE DRAWINGS

The objects, features and advantages of the present invention are readily apparent from the following detailed description of the best mode taken in connection with the accompany drawings in which:

FIG. 3 is a fragmentary elevational view of the fork assembly of FIG. 2 with the cam plate removed;

FIG. 4 is a perspective view of the inner bracket of the invention;

FIG. 5 is a fragmentary side elevational view of the fork assembly in its normal position corresponding to FIG. 1;

FIG. 6 is a view similar to FIG. 5 showing the mechanism in its free unlocked mode corresponding to FIG. 1A; and FIG. 7 is a view similar to FIG. 5 showing the mechanism in its locked mode corresponding to FIG. 1B.

DETAILED DESCRIPTION OF THE INVENTION

Figure 1:
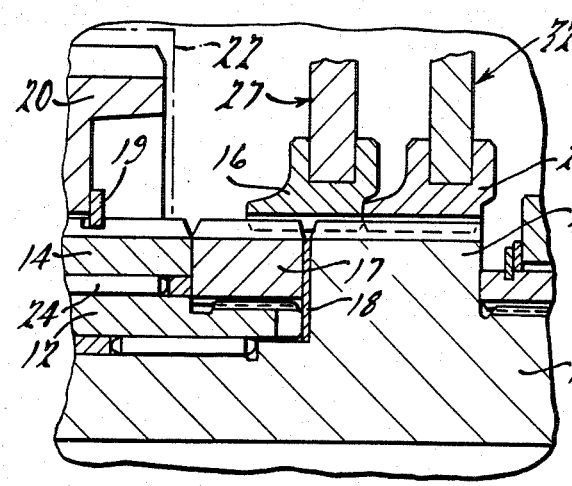
FIG. 1 is a fragmentary, sectional elevational view of a transfer case output shaft clutch showing portions of the forks in their two wheel drive mode.

In FIG. 1, numeral 10 designates a main shaft of a vehicle gear box such as a transfer case. An example of one type of transfer case is for use in a four-wheel drive vehicle having two-wheel drive and four-wheel drive modes. One form of such a transfer case is shown in U.S. Pat. No. 4,373,604 issued Feb. 15, 1983 to Lunn et al, the disclosure of which is incorporated by reference herein.

As explained in the Lunn et al patent a tubular member 12 is selectively coupled to a toothed carrier 14 by a shiftable two-wheel, four-wheel mode clutch collar 16. The carrier 14 is secured against axial displacement on the tubular member 12 by clutch gear 17 and a thrust washer 18. The carrier 14 has a drive sprocket 20 fixedly mounted thereon by retaining rings 19 to rotate therewith. The sprocket drives a chain, shown in phantom at 22 in turn drives a front drive shaft that is not illustrated. For a description of one example of a front-wheel drive shaft arrangement see the above-mentioned Lunn et al patent.

FIG. 1 shows the carrier 14 mounted for rotation on the tubular member 12 by a bearing 24. The clutch gear 17 is splined at the free end of the tubular member 12 and is engaged in sliding relation with the mode clutch collar 16. The clutch collar 16 is shown in FIG. 1 in its normal intermediate position wherein the collar's internal splines are engaged only with the external splines of clutch gear 17 and the shaft 10 externally splined portion 26.

Figure 1A:
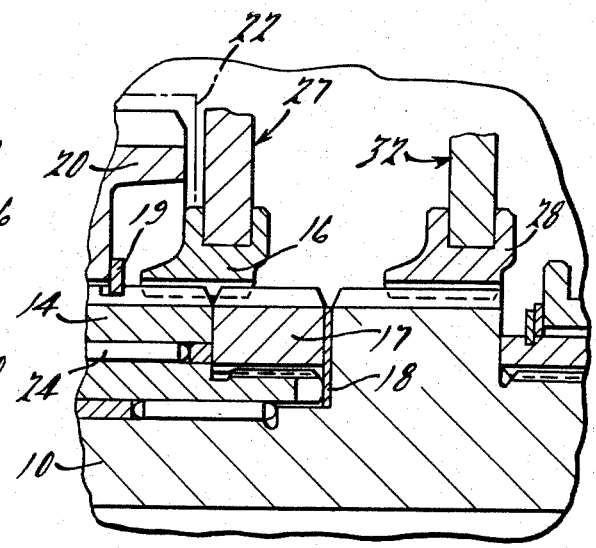
FIG. 1A is a view similar to FIG. 1 showing the forks in their full time four wheel drive unlocked mode.

When the mode clutch collar 16 is shifted from its two-wheel drive mode (FIG. 1) to the left by a mode fork assembly, partially indicated at 27, to its position shown in FIG. 1A, its internal splines engages the external spline of both the clutch gear 17 and the carrier 14. In the FIG. 1A state the transfer case is placed in its four wheel full time drive mode. Upon the mode clutch collar 16 being shifted to the right by mode fork assembly 27 the transfer case is returned to its FIG. 1 two-wheel drive mode.

Figure 1B:
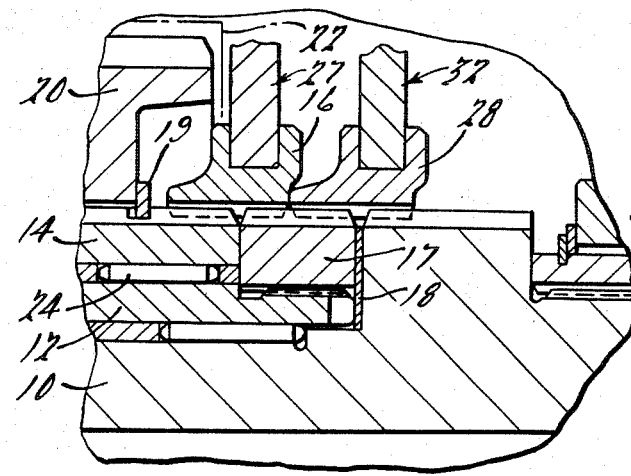
FIG. 1B is a view similar to FIG. 1 showing the forks in their four wheel drive locked.

A second lock clutch collar 28 has its internal splines in sliding relation with the external splined portion of the shaft 10. When the mode clutch collar 16 is in its full time four-wheel drive position of FIG. 1A the lock clutch collar 28 may be manually shifted to the left by lock fork assembly 29. This results in the lock collar 28 being moved to its FIG. 1B position where its internal splines engage the external splines on both the clutch collar gear 17 and the shaft portion 26 placing the transfer case in its four-wheel drive locked state.

Figure 2:
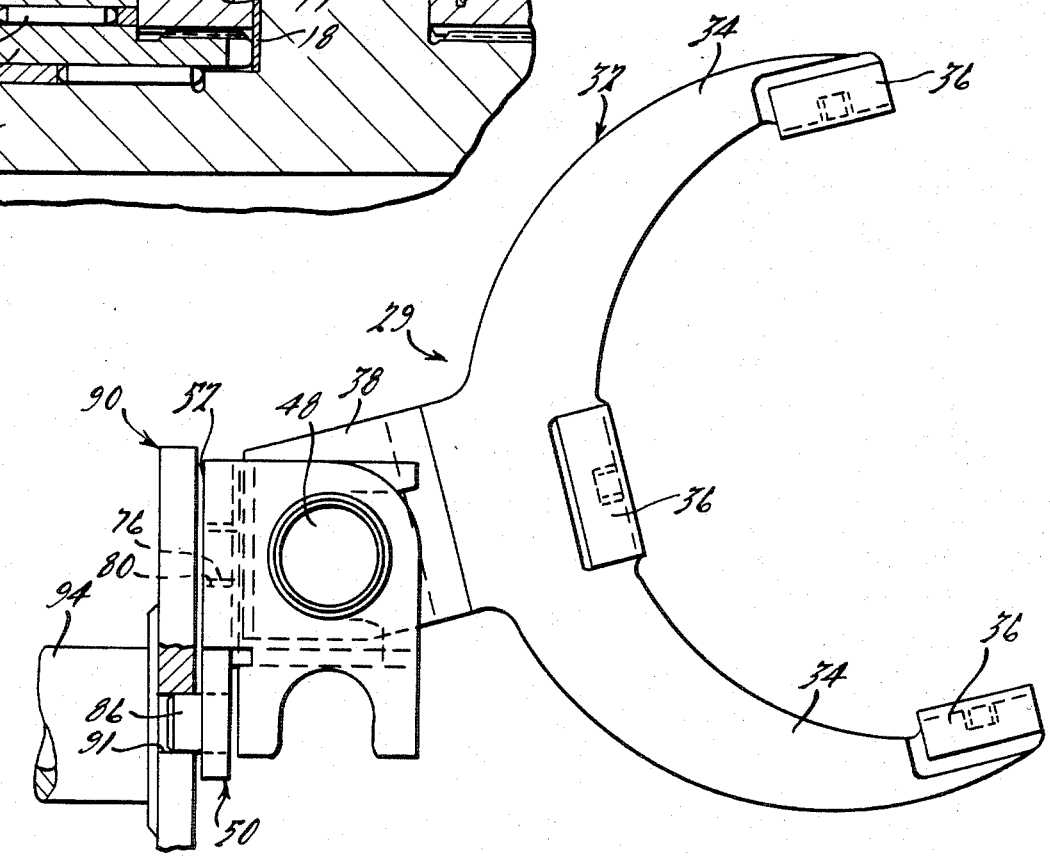
FIG. 2 is a fragmentary elevational view, partly in section, of the shift fork assembly of the present invention.

Turning now to FIG. 2, the lock fork assembly 29, which is the subject of the present invention, will now be discussed in detail. The fork assembly 29 includes a fork member 32, preferably pressed and bent from sheet metal, having clutch engaging projections 34. Three clutch engaging pads 36, molded from plastic material, are removably attached to the fork member as shown in FIG. 2. As seen in FIG. 3 the fork member has an L-shaped offset arm 38 with an aperture 40 formed therein. A cylindrical sleeve 42 extends through the aperture 40 and is suitably fixed to the arm 38 as by welding. The sleeve 42 defines forward 44 and aft 46 tube members with the forward tube member 44 having a predetermined length in the order of five times the length of the aft tube member 46.

A shift rod or rail 48 is slidably received within the sleeve 42 and its free ends are suitably supported in the transfer case housing. An outer U-shaped bracket 50 is shown in FIGS. 3 and 5 having a base 52 and a pair of first and second flanges 54 and 56, respectively, extending normal to the base 50. The first flange 54 has an aperture 58 therein of a determined diameter sized for slidably receiving the forward tube member 44 therethrough. The outer bracket second flange 56 has an aperture 60 of smaller diameter formed therethrough sized for the slidable reception of the shift rail 48.

As best seen in FIGS. 4 and 5, an inner U-shaped bracket 62 is nested in the outer bracket 50. The inner bracket has a base portion 64 and a pair of first and second flanges 66 and 68, respectively extending normal to the base 64. The first flange 66 has an open sided slot 70 terminating in a half-round fillet 72. The half-round fillet 72 has its center of curvature aligned with the center of aperture 74 in the second flange 68. The aperture 74 is sized to slidably receive the shift rail 48 while the diameter of the half-round fillet 72 and slot 70 are of a size to slidably match the outer diameter of tube member 46.

The inner bracket 62 has an axial length less than one-half the axial length of the outer bracket 50. The inner bracket 62 is thus sized for nested positioning within the outer bracket and is positioned with its open side oriented at substantially a right angle with respect to the open side of the outer bracket 50.

With reference to FIGS. 3 and 4 it will be seen that the inner bracket first flange 66 has a lug 76 extending from the upper edge 78 thereof. The lug 76 is sized for slidable reception in a longitudinally extending rectangular guideway 80 located in the base 52 of the outer bracket 50. The guideway 80 has a predetermined axial length such that its fore and aft transverse stop ends 82 and 84, respectively, limit the axial travel and prevent rotation of the inner bracket 62 relative to the outer bracket 50.

In FIGS. 2 and 3 it will be seen that the base of outer bracket 50, has a laterally projecting lobe 86 provided with an upstanding pin 88. FIG. 2 shows the upper surface of base 52 supporting in flush relation thereon a speed range sector or cam plate 90. The cam plate 90 has several cam slots one of which is shown at 91 operative for receiving the pin 88. An operating shaft 94 is fixedly mounted on the cam plate 90 and suitable means (not shown) are provided to slide the cam plate 90 causing the pin 88 to move the outer bracket 50 for reciprocal longitudinal travel.

Turning now to FIGS. 3 and 5, the outer 50 and inner 62 brackets are shown in their free spring biased position with lug 76 located adjacent the aft end 84 of guideway 80. It will be seen that a first compression helical spring 92 encircles the tube portion 44 of sleeve 42 in flush contact between the outer bracket first flange 54 and the inner bracket first flange 66. An annular washer 95 is shown located on the flange 66 to seat the right-hand end of the first spring 92. The first spring 92 thus biases the inner bracket to the right such that its second flange 68 is in flush contact with the outer bracket second flange 56.

A second compression helical spring 96 encircles the aft tube member 46 and a portion of the rail 48. The second spring 96 operates to bias the fork arm 38 to the left into flush contact with the inner bracket first flange 66. The relative forces of the first and second springs are not a concern because of applicant's unique nested bracket arrangement.

In operation, upon the driver exerting a predetermined force on the shaft 94 the cam plate 90 moves the pin 88 causing the outer bracket 50 to travel to the left on the common axis of rail 48 and sleeve 42 from its free position (FIG. 5) to its locked position shown in FIG. 6. Because of the torque applied to the shaft 10, however, a resistance force is exerted on the lock clutch collar 28 momentarily preventing the fork 32 from shifting to its FIG. 1B four-wheel drive locked position.

The invention compensates for this momentary shaft resistance condition by allowing the driver to shift the lever 94 to its engaged position until a torque reversal is applied to the shaft 10 removing the shaft resistance condition. As seen in FIG. 6 the outer 50 and inner 62 brackets are both shifted in unison on the sleeve 42 and rod 48 toward the left by the action of the cam plate 90 driving on the pin 88. The rail 48, fork member 32, and sleeve 42 remain stationary with the lock clutch collar 28. During this time the second biasing spring 96 is being compressed between the fork arm 38 and the inner bracket second flange 68. Thus, when the momentary resistance condition is relieved the force of spring 96 slides the tube 42 and fork 32 on the stationary rail 48 to the left shifting the lagging lock clutch collar 28 to its locked position shown in FIG. 1B.

When the transmission shaft 94 is manually operated by the driver to its unlocked position the cam plate moves the pin 88 towards the right to the position shown in FIG. 7. In this mode the outer bracket 50 is shifted to the right while the fork 32 and its sleeve 42 are again held fixed by the resistance condition of clutch collar 28. It will be noted that in the FIG. 7 mode the lug 76 engages the guideway stop end 82 to limit the axial travel of the outer bracket 50. In the momentary position of FIG. 7 the first biasing spring 92 is compressed between the outer bracket first flange 54 and the inner bracket first flange 66. Upon the resistance condition being relieved the stored force of the push spring 92 is sufficient to slide the sleeve 42 and fork 32 to the right and move the lock clutch collar 28 to its unlocked position of FIG. 1A.

Although only one embodiment of the subject invention has been illustrated and described, modifications and variations will readily come to mind of a person skilled in the art which modifications and variations do not fall outside the scope of the invention as defined hereinafter.

What is claimed is:

1. A gearbox fork arrangement for controlling shift clutching means comprising a shift rail disposed in spaced parallel relation with a main shaft, means for preventing axial movement of said rail during selected modes of gearbox operation, a shift fork assembly adapted to slide axially on said rail and having projecting portions adapted to co-act with the clutching means for slidable reciprocal travel on said main shaft from its normal intermediate position, the improvement wherein said fork having an upstanding arm portion, an axially extending sleeve extending through said fork arm defining forward and aft tube portions, said sleeve encircling said rail for reciprocal movement thereon along their common axis, outer and inner U-shaped brackets, each said bracket having a base portion and a pair of first and second flanges arranged substantially perpendicular to said axis, said inner U-shaped bracket nested within said outer U-shaped bracket, each said pair of flanges having aligned apertures such that the first flange of each said bracket slides on said forward tube portion and the second flange of each said bracket slides on said shift rail, a first coil spring concentrically disposed about said forward tube portion intermediate corresponding first flanges of said brackets and biasing the second flange of said inner bracket into contact with the second flange of said outer bracket, a second coil spring concentrically disposed about said aft tube portion and a portion of said rail intermediate said fork arm portion and the second flange of said inner bracket, said second spring operative between said fork arm and said inner bracket second flange to bias said fork arm into its normal intermediate position contacting said inner bracket first flange, means for axially shifting said outer bracket to one gear range position by compressing said second spring, such that upon release of resistance force means on said fork said second spring subsequently shifts said fork in one axial direction to its one gear range position, and said means operative for shifting said outer bracket to its other axial gear range position by compressing said first spring, such that upon release of the resistance force means on said fork said first spring subsequently shifts said fork in the opposite axial direction to its other gear range position.

2. The arrangement according to claim 1 wherein said inner bracket having a lug thereon sized for slidable reception in a longitudinally extending guideway in said outer bracket aperture to limit travel of said inner bracket relative to said outer bracket while preventing relative rotation between the inner and outer brackets.

3. A transfer case fork arrangement for controlling a shift locking clutch collar in a four-wheel drive vehicle comprising a shift rail disposed in spaced parallel relation with the vehicle's main power shaft, means for preventing axial movement of said rail during locked and unlocked four-wheel drive modes of said transfer case, a shift fork assembly adapted to slide axially on said rail and having projecting portions adapted to co-act with said locking clutch collar for slidable reciprocal travel on said main shaft from its normal intermediate position, the improvement wherein said fork having an upstanding arm portion, an axially extending sleeve extending through said fork arm and affixed thereto defining forward and aft tube portions, said sleeve encircling said rail for reciprocal movement thereon along their common axis, outer and inner U-shaped brackets, each said bracket having a base portion and a pair of first and second flanges arranged substantially perpendicular to said axis, said inner U-shaped bracket nested within said outer U-shaped bracket, each said pair of flanges having aligned apertures such that the first flange of each said bracket slides on said forward tube portion and the second flange of each said bracket slides on said shift rail, a first coil spring concentrically disposed about said forward tube portion intermediate corresponding first flanges of said brackets so as to bias the second flange of said inner bracket into contact with the second flange of said outer bracket, a second coil spring concentrically disposed about said aft tube portion and a portion of said rail intermediate said fork arm portion and the second flange of said inner bracket, said second spring operative between said fork arm and said inner bracket second flange to bias said fork arm into its normal intermediate position contacting said inner bracket first flange, means for shifting said outer bracket in an aft direction by compressing said second spring, such that upon release of resistance force means on said fork said second spring subsequently shifts said fork and said locking clutch collar forwardly to its four-wheel drive locked position, and said shifting means operative for shifting said outer bracket in a forward direction to its locked position by compressing said first spring, such that upon release of the resistance force means on said fork said spring subsequently shifting said fork to its unlocked gear range position.

4. The transfer case fork arrangement as set forth in claim 3 wherein said inner bracket having a lug thereon sized for slidable reception in a longitudinally extending guideway in said outer bracket operative to limit travel of said inner bracket relative to said outer bracket, while preventing relative rotation between the inner and outer brackets.

* * * * *